United States Patent
Takahashi et al.

(10) Patent No.: US 8,911,002 B2
(45) Date of Patent: Dec. 16, 2014

(54) VEHICLE WITH PARKING BRAKE LEVER

(71) Applicant: Honda Motor Co., Ltd., Tokyo (JP)

(72) Inventors: Yoshiki Takahashi, Wako (JP); Futoshi Miyakawa, Wako (JP); Yukinori Kurakawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/847,609

(22) Filed: Mar. 20, 2013

(65) Prior Publication Data

US 2013/0278014 A1  Oct. 24, 2013

(30) Foreign Application Priority Data

Mar. 30, 2012  (JP) .................................. 2012-079847

(51) Int. Cl.
  *B62D 33/06*  (2006.01)
  *B62D 63/02*  (2006.01)
  *B60T 7/10*  (2006.01)

(52) U.S. Cl.
  CPC ............ *B62D 33/0617* (2013.01); *B62D 63/02* (2013.01); *B60T 7/102* (2013.01)
  USPC ....................................... 296/190.01; 296/70

(58) Field of Classification Search
  CPC ..................... B60H 2001/00228; B60T 7/102
  USPC ......... 296/190.01, 190.09, 70, 209, 64, 65.01
  IPC ...................................................... B62D 36/06
  See application file for complete search history.

(56) References Cited

U.S. PATENT DOCUMENTS

| | | | |
|---|---|---|---|
| 2,223,565 A * | 12/1940 | Illmer ............................. | 74/485 |
| 3,352,597 A * | 11/1967 | Barenyi et al. ............. | 296/181.1 |
| 5,538,309 A * | 7/1996 | Murray .......................... | 296/64 |
| 5,553,909 A * | 9/1996 | Sacco et al. ................ | 296/186.1 |
| 6,056,078 A * | 5/2000 | Pham ............................ | 180/219 |
| 6,942,245 B2 * | 9/2005 | Takimoto et al. .......... | 280/730.1 |
| 7,695,056 B2 * | 4/2010 | Hanson et al. ............... | 296/204 |
| 7,878,540 B2 * | 2/2011 | Takimoto et al. .......... | 280/743.2 |
| 2001/0020377 A1 * | 9/2001 | Matsuzaki et al. ............ | 70/247 |
| 2003/0141736 A1 * | 7/2003 | Chernoff et al. ........... | 296/65.01 |
| 2010/0187850 A1 * | 7/2010 | Murray .......................... | 296/64 |

FOREIGN PATENT DOCUMENTS

JP  2005-157642  6/2005

* cited by examiner

*Primary Examiner* — Pinel Romain
(74) *Attorney, Agent, or Firm* — Squire Patton Boggs (US) LLP (57) ABSTRACT

A driver seat is disposed at a position offset by a predetermined distance to the left from a vehicle width center line and an ingress-egress opening through which a driver gets on and off the vehicle is provided on a lateral side of the driver seat. A door is attached to a left upper frame via a door hinge and the ingress-egress opening is opened and closed by using the door. A parking brake lever is disposed near the left upper frame and the door hinge is provided on the same left upper frame. Since the door hinge and the parking brake lever are disposed close to each other, there is no possibility of the parking brake lever hindering ingress and egress.

12 Claims, 7 Drawing Sheets

VEHICLE WITH PARKING BRAKE LEVER

BACKGROUND

1. Field

The present invention relates to a vehicle including a parking brake lever operated by a driver with the driver's left hand.

2. Description of the Related Art

A vehicle is equipped with a parking brake which prevents the vehicle from moving while being parked, in addition to a brake used while travelling. The parking brake is operated with a parking brake lever or a parking brake pedal. Among these, various attachment structures for the parking brake lever are known (see, for example, Japanese Patent Publication No. 2005-157642 (Patent Document 1)).

Figure 1:
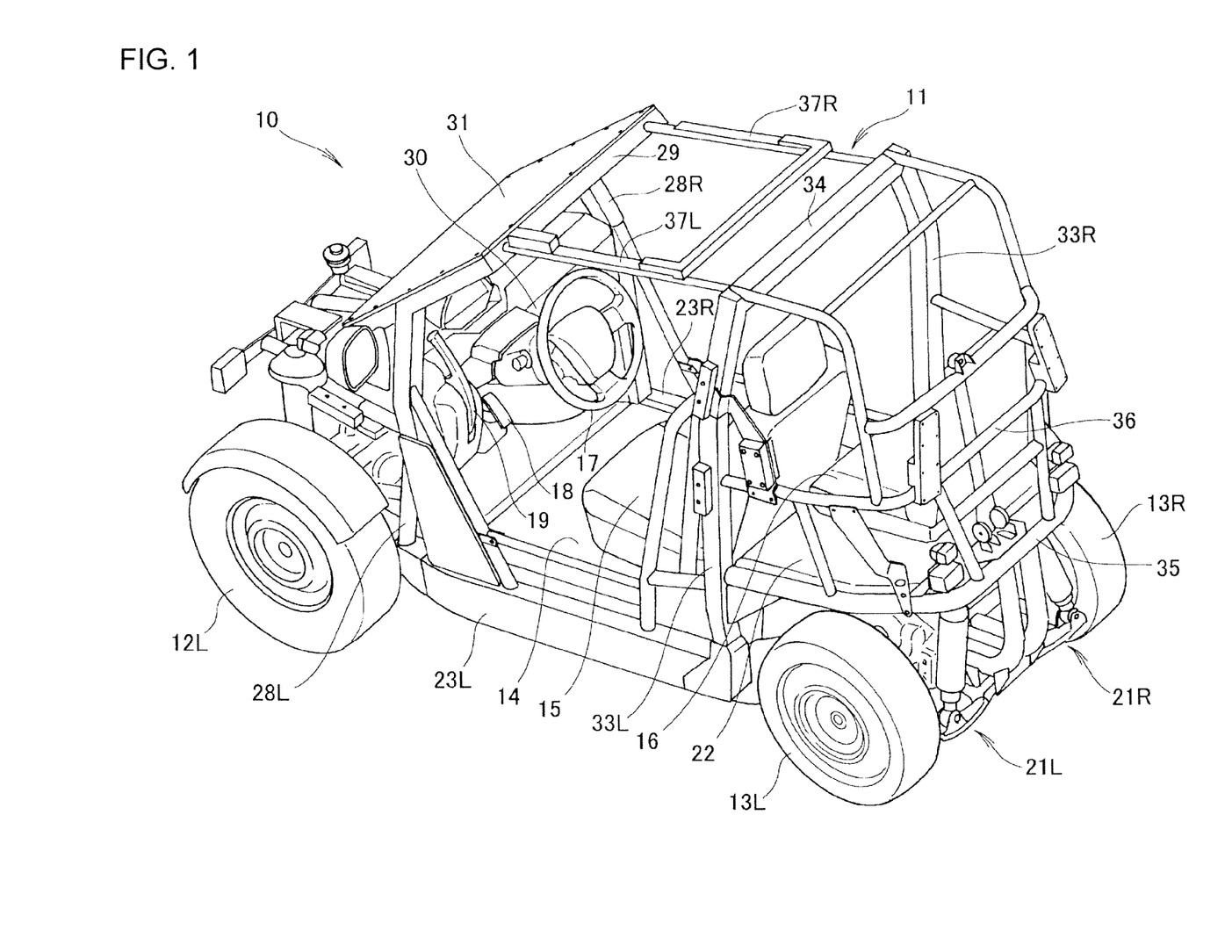
FIG. 1 is a perspective view of a vehicle according to embodiments of the present invention.

As shown in FIG. 1 of Patent Document 1, a console box (2) (The number in parentheses indicates reference numeral described in Patent Document 1. The same shall apply hereinafter.) is disposed in a center portion of an instrument panel (1) in a vehicle width direction. A parking brake lever (10) is provided in the console box (2) and a driver can operate a parking brake in a riding posture for operating a steering wheel.

A structure of Patent Document 1 is applied to a vehicle in which a passenger seat is on a left side of a driver seat and the console box (2) is disposed between the driver seat and the passenger seat.

Incidentally, a narrow small vehicle which is being developed nowadays includes only a driver seat or includes a driver seat and a passenger seat disposed on a rear side of the driver seat. The console box (2) and the parking brake lever (10) provided in such a narrow small vehicle takes the space in a vehicle cabin and also affects ingress and egress.

Accordingly, for narrow small vehicles, consideration is required to avoid reduction of space in a vehicle cabin and to avoid effects on ingress and egress even when a parking brake lever is installed with no console box being provided.

There is a demand for a structure for disposing a parking brake lever which is suitable for a narrow small vehicle.

SUMMARY

An object of the present invention is to provide a technique for disposing a parking brake lever which is suitable for a narrow small vehicle.

In a first embodiment, a vehicle includes a parking brake lever operated inside a cabin in a space on an outer side of a steering wheel by a driver with the driver's left hand. A driver seat, on which the driver can be seated, is disposed at such a position that a center line of the driver seat is offset by a predetermined distance in a vehicle width direction from a vehicle width center line of the vehicle in a vehicle width direction. An ingress-egress opening through which the driver gets on and off the vehicle is provided on a lateral side of the driver seat. The steering wheel to be operated by the driver is provided on a dashboard disposed on a front side of the driver seat, and the parking brake lever is provided in the dashboard. In a vehicle side view, a grip portion of the parking brake lever is disposed at the same height as the steering wheel and on a vehicle front side of the steering wheel.

In a second embodiment, only the driver seat can be provided as a front seat disposed in the vehicle.

In a third embodiment, the parking brake lever is supported at a lower end by a pin to be swingable toward a front and a rear of the vehicle. The lever can be set to a parking braking state by pulling an upper portion thereof toward the rear of the vehicle. The parking brake lever is located on the vehicle front side of the steering wheel even when the parking brake lever is pulled toward the rear of the vehicle.

In a fourth embodiment, a left upper frame extends upward from a front portion of a left side sill which is an element of a vehicle body frame. A bracket is attached to the left upper frame, the pin is attached to the bracket, and the parking brake lever is thereby supported by the left upper frame.

In a fifth embodiment, a parking brake wire extends from the parking brake lever and is routed along the left side sill.

In a sixth embodiment, a door is attached to the left upper frame via a door hinge and the ingress-egress opening is opened and closed by the door.

According to the first embodiment, in a vehicle side view, the parking brake lever is disposed at the same height as the steering wheel and on the vehicle front side of the steering wheel. Accordingly, there is no possibility of the parking brake lever hindering ingress and egress. Moreover, since no center console is required, there is no possibility of space in the vehicle cabin being reduced.

According to the second embodiment of the invention, only the driver seat is provided as a front seat disposed in the vehicle. There is no possibility of the parking brake lever hindering the ingress and egress. Requiring no center console, the present invention provides a technique for disposing the parking brake lever which is suitable for a narrow small vehicle.

According to the third embodiment of the invention, the parking brake lever is located on the vehicle front side of the steering wheel even when the parking brake lever is pulled toward the rear of the vehicle. Accordingly, the parking brake lever does not hinder the ingress and egress of the driver and an excellent ingress-egress characteristic is thereby secured.

According to the fourth embodiment of the invention, the left upper frame extends upward from the front portion of the left side sill, the bracket is attached to the left upper frame, the pin is attached to the bracket, and the parking brake lever is thereby supported by the left upper frame. Since the driver seat is offset to the left, the parking brake lever can be disposed near the left upper frame. Hence, the parking brake lever can be supported by using the left upper frame with no special supporting member being prepared. Since no special supporting member is required, the vehicle can be reduced in weight and cost.

According to the fifth embodiment of the invention, the parking brake wire extends from the parking brake lever and the parking brake lever wire is routed along the left side sill. Since the parking brake lever is disposed near the left upper frame, the parking brake wire can be routed along the left side sill and the routing of the parking brake wire is thereby facilitated.

According to the sixth embodiment of the invention, the door is attached to the left upper frame via the door hinge and the ingress-egress opening is opened and closed by using the door. Since the parking brake lever is disposed near the left upper frame and the door hinge is provided on the same left upper frame, the door hinge and the parking brake lever are disposed close to each other and there is no possibility of the parking brake lever hindering the ingress and egress.

DETAILED DESCRIPTION

Embodiments of the present invention are described below based on the accompanying drawings. Note that the drawings are to be seen in a direction in which the reference numerals can be read properly. Moreover, front, rear, left, and right are based on a driver.

As shown in FIG. 1, an electric vehicle 10 can be a narrow four-wheel vehicle as follows. A vehicle body frame 11 is provided with a front wheel 12L (L is a suffix indicating left; the same hereafter) and 12R (shown in FIG. 4. R is a suffix indicating right; the same hereafter), and rear wheels 13L, 13R. A driver seat 15 is provided on a floor 14. A passenger seat 16 is provided behind the driver seat 15. A steering wheel 17, a brake pedal 18, and a parking brake lever 19 are provided in front of the driver seat 15.

The passenger seat 16 is disposed between the left and right rear wheels 13L, 13R and between suspension devices 21L, 21R. The passenger seat 16 may be used as a rear cargo bed. Alternatively, the passenger seat 16 may be detachably attached onto a rear cargo bed 22.

A configuration of the vehicle body frame 11 is described.

Front upper frames 28L, 28R extend upward respectively from front end portions of side sills 23L, 23R. A cross sub-member 29 is laid between upper ends of the front upper frames 28L, 28R. A front shield 31 is attached to the front upper frames 28L, 28R and the cross sub-member 29 from the front.

Moreover, rear upper frames 33L, 33R extend upward respectively from rear end portions of the side sills 23L, 23R and a cross sub-member 34 is laid between upper ends of the rear upper frames 33L, 33R. Furthermore, a square-U shaped rear subframe 35 extends from the rear upper frames 33L, 33R at a position above the rear wheels 13L, 13R to surround the passenger seat 16 from left, right, and rear. A cage-shaped cage frame 36 extends from the rear upper frames 33L, 33R and the cross sub-member 34 to surround the passenger seat 16 at a position above the rear subframe 35. Longitudinal members 37L, 37R are laid between the front cross sub-member 29 and the rear cross sub-member 34 and a vehicle cabin is thus formed.

A dashboard 30 is laid between the left and right front upper frames 28L, 28R. The steering wheel 17 is disposed slightly to the left of the vehicle-width center of the dashboard 30 and the parking brake lever 19 is disposed on a left side of the steering wheel 17, in the dashboard 30.

Figure 2:
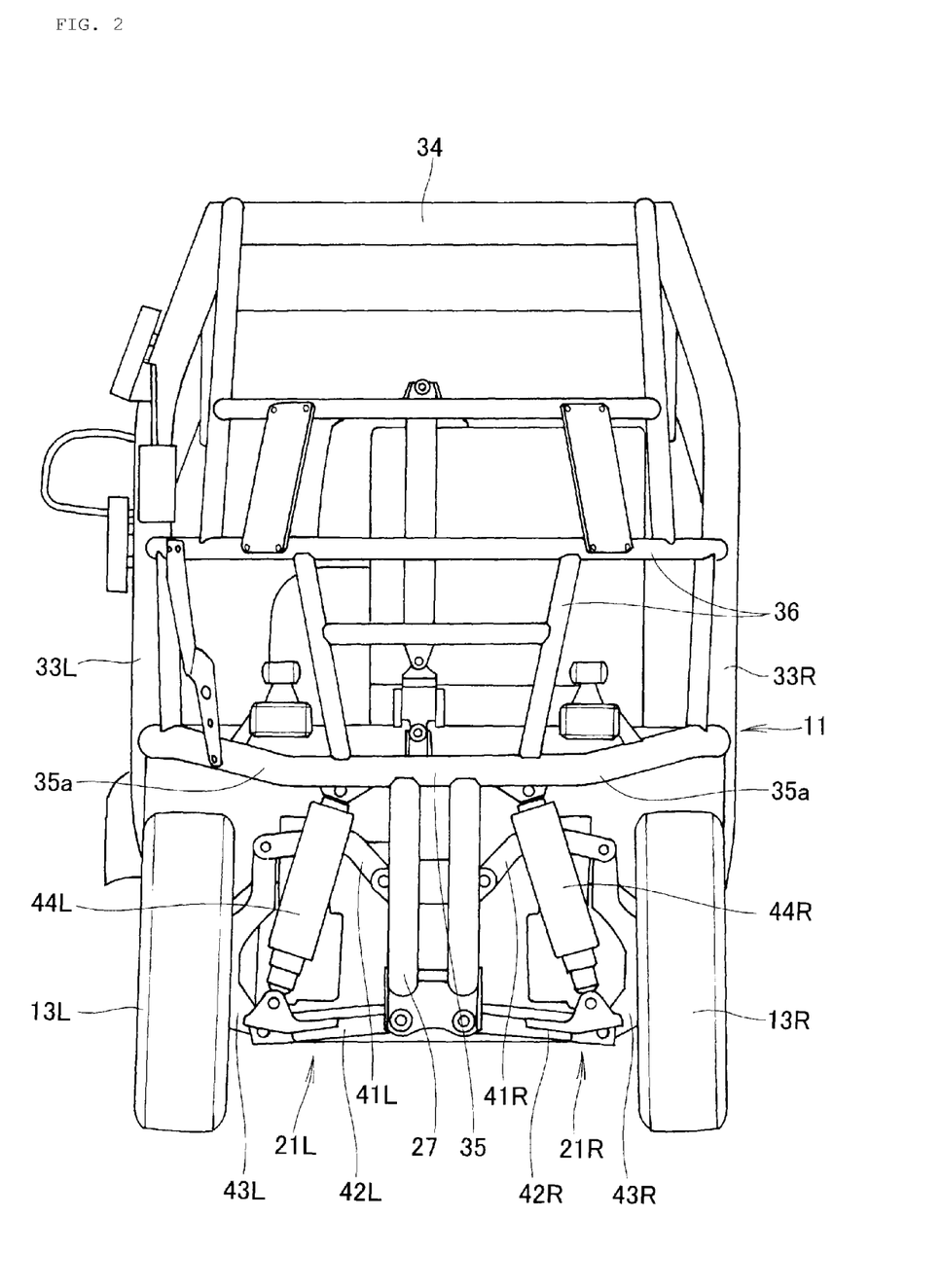
FIG. 2 is an enlarged view of a main portion of the vehicle according to embodiments of the present invention.

As shown in FIG. 2, the rear wheels 13L, 13R which are left and right drive wheels are supported by the suspension devices 21L, 21R to be vertically swingable on the vehicle body frame 11. Rear wheels 13L, 13R are each inclined in such a way that an upper end thereof is closer to the vehicle width center than a lower end thereof is.

The rear subframe 35 extending in a vehicle width direction is bent upward in portions over the rear wheels 13L, 13R. Providing bent portions 35a, 35b can secure spaces for upward swing of the rear wheels 13L, 13R.

The left suspension device 21L includes an upper arm 41L and a lower arm 42L which extend to the left from the vehicle body frame 11 in the vehicle width direction, a knuckle 43L which is connected to distal ends of the arms 41L, 42L, and a rear cushion 44L which is laid between the end of the lower arm 42L and the vehicle body frame 11 and cushions vertical movements of the rear wheels 13L, 13R.

In the right suspension device 21R, the suffixes of the reference numerals are changed from L to R and detailed description of the right suspension device 21R is omitted.

Figure 3:
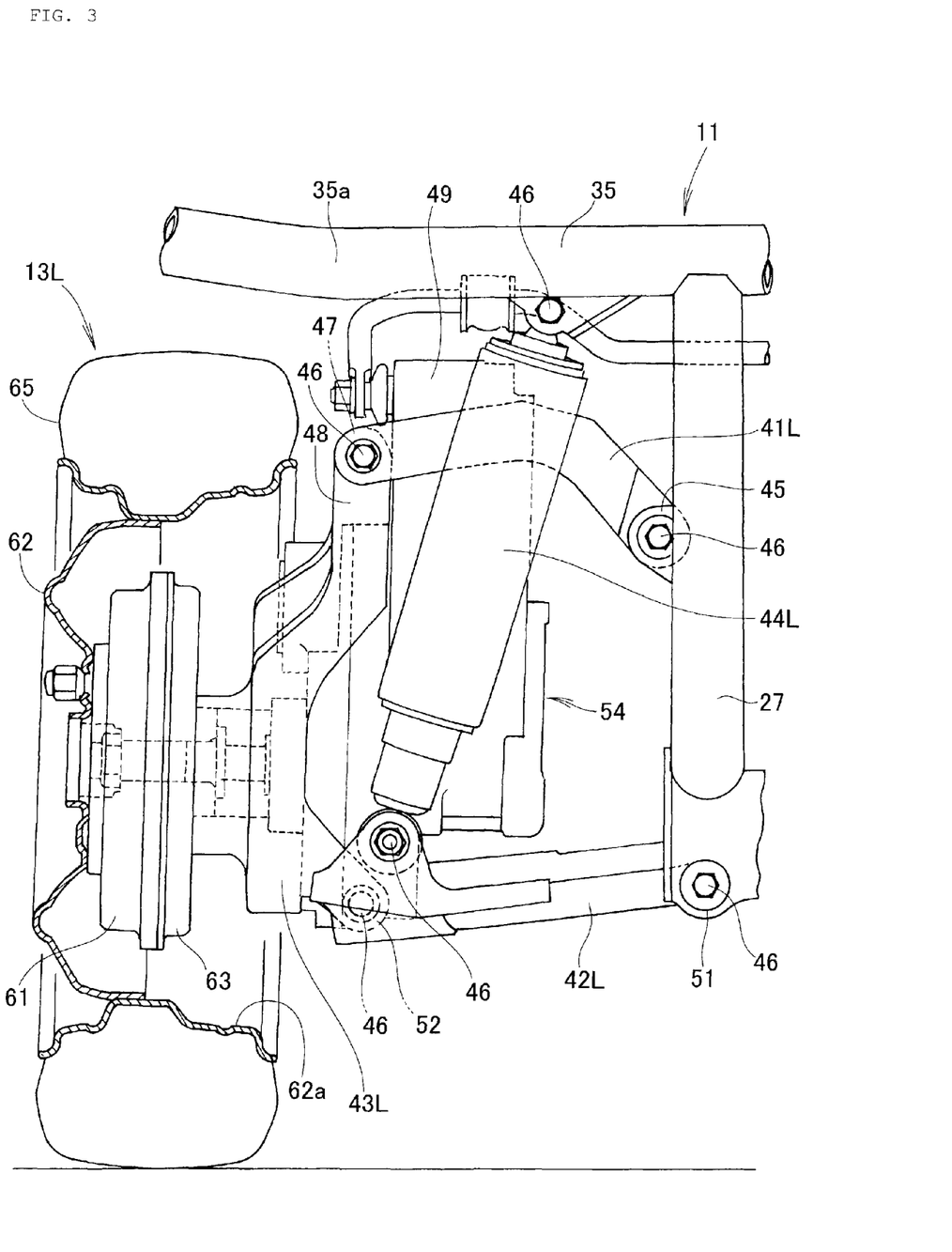
FIG. 3 is a rear view of the vehicle according to embodiments of the present invention.

As shown in FIG. 3, the upper arm 41L is connected to the vehicle body frame 11 (specifically, the rear portion subframe 27) at a vehicle body frame side connection portion 45 with a connector 46. A bolt formed by providing a bolt head and a female screw on a pin extending in a near-far direction of the drawing is preferable as the connector 46.

The distal end of the upper arm 41L is connected to an upper arm portion 48 of the knuckle 43L at a joint portion 47 with the connector 46.

The upper arm 41L is a V-shaped member having an intermediate portion (center portion in the vehicle width direction) protruding upward. The vehicle body frame side connection portion 45 is below the joint portion 47.

A motor case 49 is disposed on the far side (vehicle front side) of the upper arm 41L in the drawing. Forming the upper arm 41L in a so-called "inverted-V shape" allows the upper arm 41L to avoid the motor case 49.

The lower arm 42L is also connected to a lower portion of the vehicle body frame 11 (specifically, the rear portion subframe 27) at a lower vehicle body frame side connection portion 51 with the connector 46 and is connected to a lower portion of the knuckle 43L at a lower joint portion 52 with the connector 46.

The rear cushion 44L is disposed in an oblique vertical direction. An upper portion of the rear cushion 44L is connected to the vehicle body frame 11 (specifically, the rear subframe 35) with the connector 46 while the lower portion thereof is connected to the lower arm 42L with the connector 46.

The rear wheel 13L includes a wheel 62 and a tire 65.

A brake device including a brake drum 61 and a brake base plate 63 as well as brake shoes and a shoe expanding part which are incorporated in the brake drum 61 and the brake base plate 63 is housed in a recessed portion 62a of the wheel 62. A brake wire extends from the brake pedal 18 to the brake device, and a parking brake wire extends from the parking brake lever 19 to the brake device.

Figure 4:
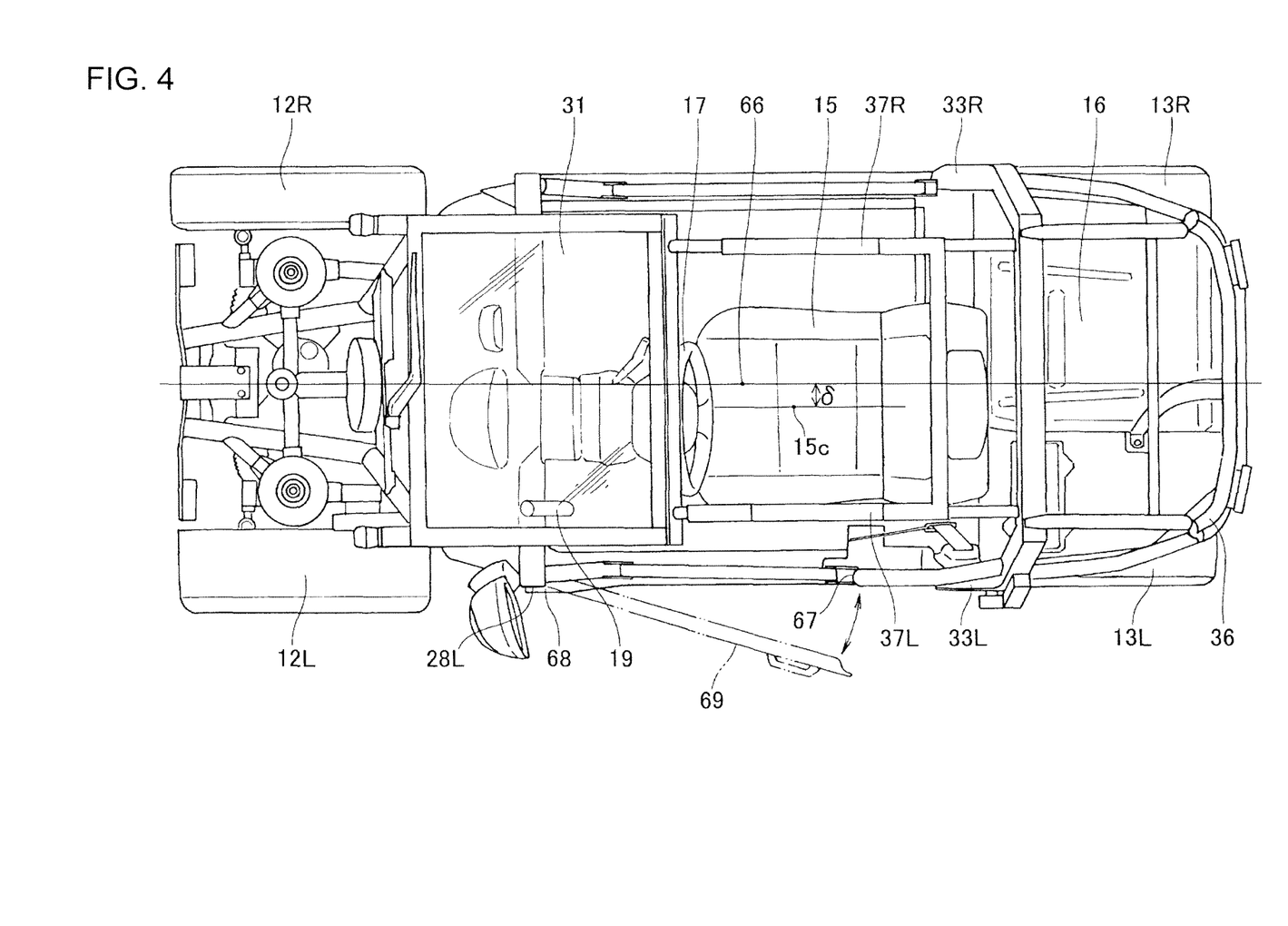
FIG. 4 is a plan view of the vehicle according to embodiments of the present invention.

As shown in FIG. 4, the driver seat 15 is disposed to be offset to the left in the vehicle width direction in such a way that a center line 15c of the driver seat 15 is offset by δ relative to a vehicle width center line 66.

Specifically, the driver seat 15 on which the driver sits is disposed at such a position that the center line 15c of the driver seat 15 is offset by the predetermined distance δ to the left from the vehicle width center line 66 of the vehicle. An ingress-egress opening 67 through which the driver gets on and off the vehicle is provided on a lateral side of the driver seat 15.

A door 69 is attached to the left upper frame (left front upper arm) 28L via a door hinge 68. The ingress-egress opening 67 can be opened and closed by the door 69. The parking brake lever 19 is disposed near the left upper frame 28L, and the door hinge 68 is attached to the same left upper frame 28L. Since the door hinge 68 and the parking brake lever 19 are disposed close to each other, there is no possibility of the parking brake lever 19 hindering the ingress and egress.

Figure 5:
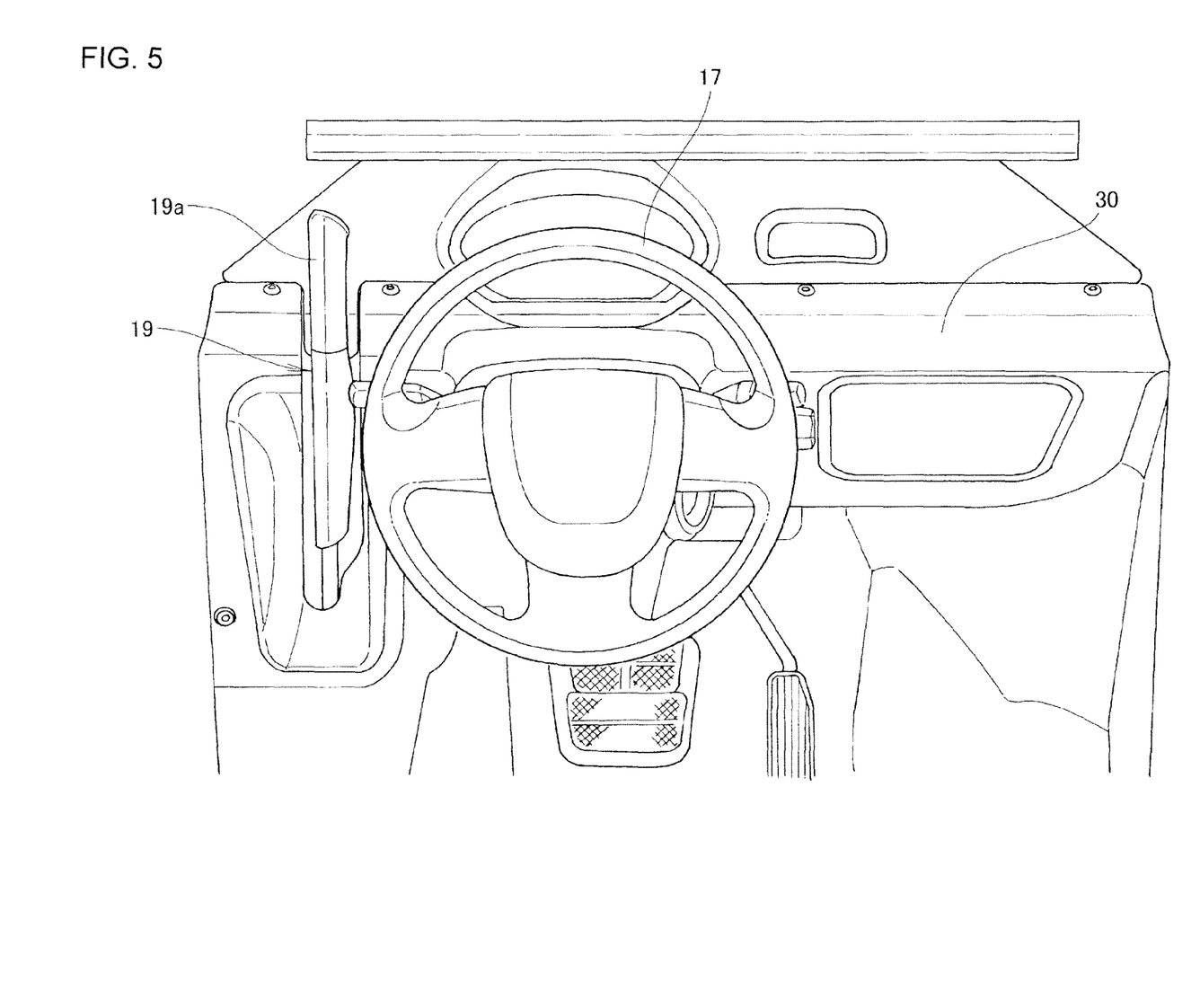
FIG. 5 is an enlarged view of a main portion of FIG. 4.

As shown in FIG. 5, the steering wheel 17 operated by the driver is provided on the dashboard 30 and the parking brake lever 19 is provided on the left side of the steering wheel 17, in the dashboard 30.

Figure 6:
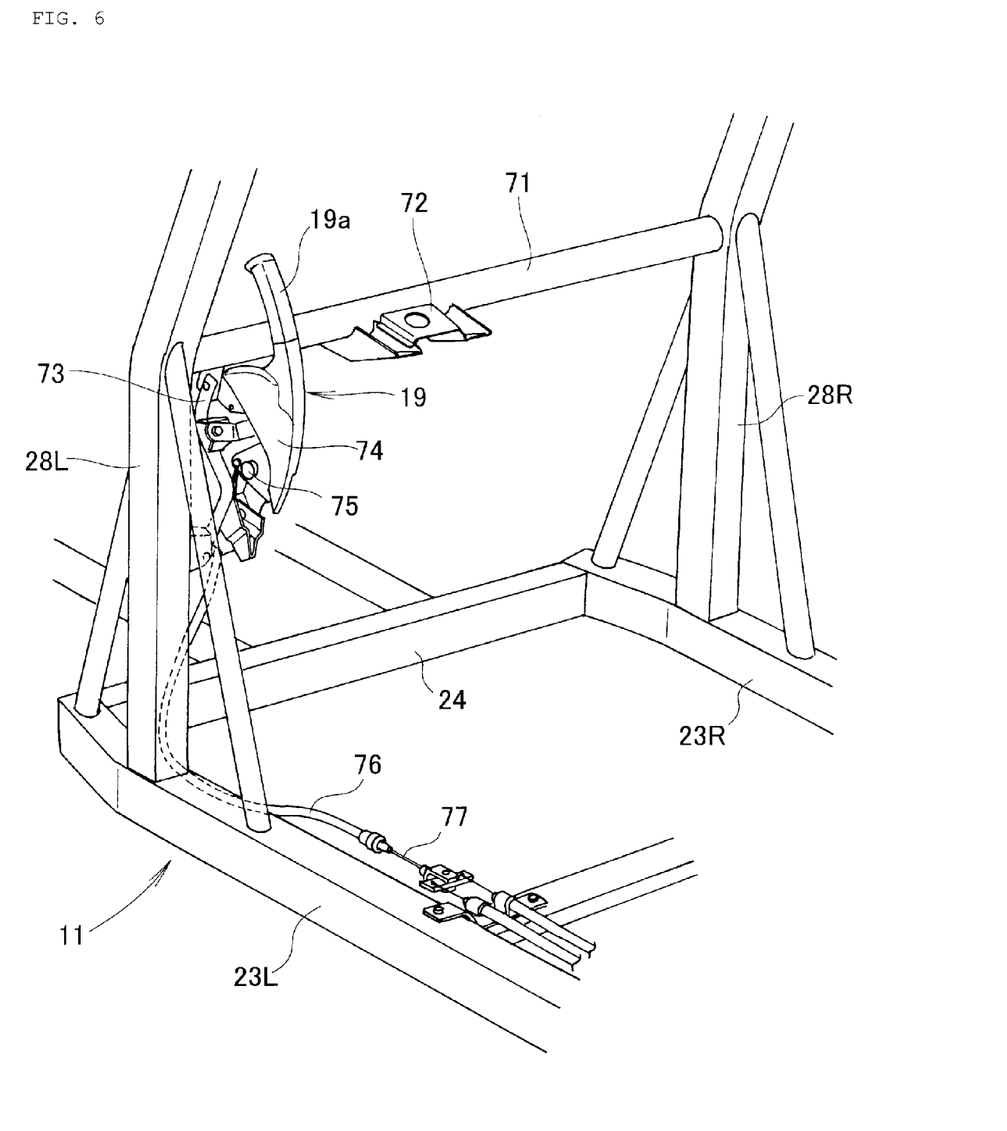
FIG. 6 is a perspective view showing an attachment posture of a parking brake lever.

Next, a supporting structure of the parking brake lever 19 is described.

As shown in FIG. 6, a front cross frame 24 is laid between front ends of the left and right side sills 23L, 23R and the left and right upper frames 28L, 28R extend upward respectively from the front portions of the left and right side sills 23L, 23R. A steering wheel post stay 71 is horizontally laid between the left and right upper frames 28L, 28R and a steering wheel post supporting bracket 72 is provided at a position on a left side of the vehicle width direction center of the steering wheel post stay 71.

A bridge member 73 is vertically laid between a left end portion of the steering wheel post stay 71 and the left upper frame 28L. Both ends of the bridge member 73 may be supported on the steering wheel post stay 71.

The parking brake lever 19 has an arc shape, and can be attached to the vehicle body frame 11 side with a bracket 74 swingably supporting the parking brake lever 19 and with a pin 75 connecting a lower portion of the parking brake lever 19 to the bracket 74.

The parking brake lever 19 is supported by the vehicle body frame 11 by connecting the bracket 74 to the bridge member 73.

A sheath 76 extends downward from the bracket 74 along the left upper frame 28L. Thereafter, the sheath 76 extends toward the rear of the vehicle along the left side sill 23L. A parking brake wire 77 is movably housed in the sheath 76 and extends from the parking brake lever 19 to the brake device (brake device includes parts denoted by reference numerals 61, 63 in FIG. 3 and the like) disposed near the rear wheel.

Figure 7:
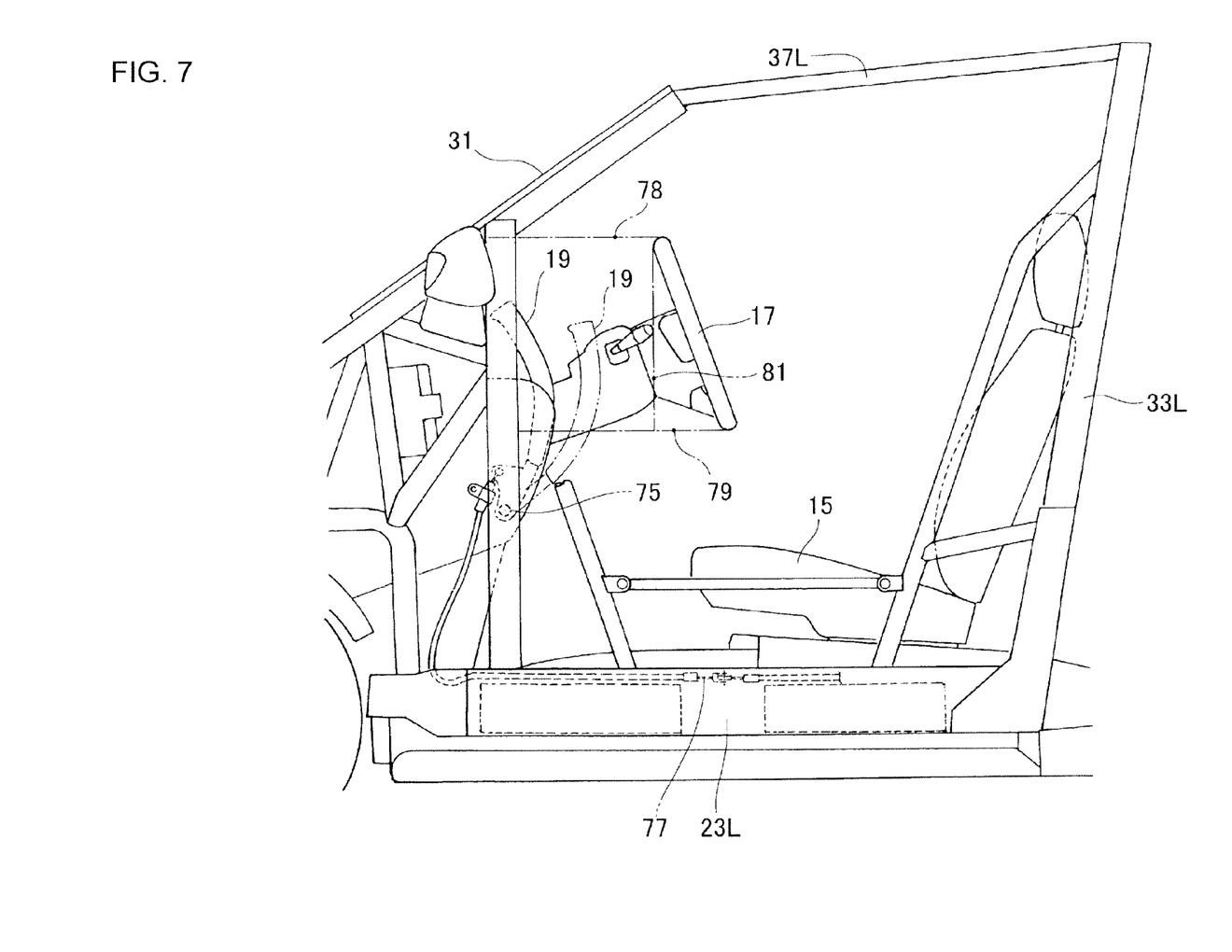
FIG. 7 is a left side view (view showing a main portion) of the vehicle.

As shown in FIG. 7, in the vehicle side view, the parking brake lever 19 is disposed at the same height as the steering wheel 17, on a vehicle front side of the steering wheel 17. Specifically, a grip portion 19a is disposed within a space surrounded by a horizontal line 78 passing through an upper end of the steering wheel 17, a horizontal line 79 passing through a lower end of the steering wheel 17, and a vertical line 81 passing through a front end of the steering wheel 17, and moves within this space.

Since the parking brake lever 19 is disposed on the vehicle front side of the steering wheel 17, there is no possibility of the parking brake lever 19 hindering the ingress and egress of the driver. In addition, since no center console is required, there is no possibility of space in a vehicle cabin being reduced.

When pulled toward the rear of the vehicle, the parking brake lever 19 moves to a position shown by an imaginary line. Even when the parking brake lever 19 pulled toward the rear of the vehicle, the parking brake lever 19 is located on the vehicle front side of the steering wheel 17. Hence, the parking brake lever 19 does not hinder the ingress and egress of the driver. Accordingly, an excellent ingress-egress characteristic is secured.

Moreover, as described by using FIG. 4, since the driver seat 15 is offset to the left in the vehicle width direction, the parking brake lever 19 can be disposed near the left upper frame 28L. Hence, the parking brake lever 19 can be supported by using the left upper frame 28L with no special supporting member being prepared. Since no special supporting member is required, the vehicle can be reduced in weight and cost.

Moreover, as shown in FIG. 6, the parking brake wire 77 is routed along the left side sill 23L. Since the parking brake lever 19 is disposed near the left upper frame 28L, the parking brake wire 77 can be routed along the left side sill 23L. Thus, the routing of the parking brake wire 77 is facilitated.

Although the power source is the electric motor in the embodiment, the drive source may be an internal combustion engine.

The present invention can be applied to a narrow four-wheel vehicle in which a driver seat and a passenger seat are arranged one behind the other. however, the invention is applicable to numerous embodiments. The above embodiments are discussed as examples only, and numerous changes and modifications could be made thereto while still remaining within the spirit and scope of the invention.

EXPLANATION OF THE REFERENCE NUMERALS

10 VEHICLE
11 VEHICLE BODY FRAME
15 DRIVER SEAT
15c CENTER LINE OF DRIVER SEAT
17 STEERING WHEEL
19 PARKING BRAKE LEVER
23L LEFT SIDE SILL
28L LEFT UPPER FRAME (LEFT FRONT UPPER FRAME)
30 DASHBOARD
66 VEHICLE WIDTH CENTER LINE
67 INGRESS-EGRESS OPENING
68 DOOR HINGE
69 DOOR
74 BRACKET
75 PIN
77 PARKING BRAKE WIRE

The invention claimed is:

1. A vehicle including a parking brake lever configured to be operated inside a cabin in a space on an outer side of a steering wheel by a driver, said vehicle comprising:
    a driver seat configured to accommodate the driver, said driver seat disposed at such a position that a center line of the driver seat is offset by a predetermined distance in a vehicle width direction from a vehicle width center line of the vehicle;
    an ingress-egress opening configured to enable the driver to get on and off the vehicle, provided on a lateral side of the driver seat,
    wherein the steering wheel is provided on a dashboard disposed on a front side of the driver seat, and wherein the parking brake lever is provided in the dashboard and in front of the driver seat, and
    wherein, in a side view of the vehicle, a grip portion of the parking brake lever is disposed within a space defined by a horizontal line passing through an upper end of the steering wheel, a horizontal line passing through a lower end of the steering wheel and a vertical line passing through a front end of the steering wheel.

2. The vehicle according to claim 1, wherein the driver seat is provided as a single front seat disposed in the vehicle.

3. The vehicle according to claim 1, wherein
    the parking brake lever is supported at a lower end by a pin to be swingable toward a front and a rear of the vehicle and is set to a parking braking state by pulling an upper portion thereof toward a rear of the vehicle, and
    wherein the parking brake lever is located within the space defined by the horizontal line passing through the upper end of the steering wheel, the horizontal line passing through the lower end of the steering wheel and the vertical line passing through the front end of the steering wheel when the parking brake lever is pulled toward the rear of the vehicle.

4. A vehicle including a parking brake lever configured to be operated inside a cabin in a space on an outer side of a steering wheel by a driver, said vehicle comprising:
  a driver seat configured to accommodate the driver, said driver seat disposed at such a position that a center line of the driver seat is offset by a predetermined distance in a vehicle width direction from a vehicle width center line of the vehicle;
  an ingress-egress opening configured to enable the driver to get on and off the vehicle, provided on a lateral side of the driver seat;
  a left upper frame extending upward from a front portion of a left side sill which is an element of a vehicle body frame; and
  a bracket attached to the left upper frame,
  wherein the steering wheel is provided on a dashboard disposed on a front side of the driver seat, and wherein the parking brake lever is provided in the dashboard, and
  wherein, in a side view of the vehicle, a grip portion of the parking brake lever is disposed within a space defined by a horizontal line passing through an upper end of the steering wheel, a horizontal line passing through a lower end of the steering wheel and a vertical line passing through a front end of the steering wheel,
  wherein the parking brake lever is supported at a lower end by a pin to be swingable toward a front and a rear of the vehicle and is set to a parking braking state by pulling an upper portion thereof toward a rear of the vehicle,
  wherein the parking brake lever is located within the space defined by the horizontal line passing through the upper end of the steering wheel, the horizontal line passing through the lower end of the steering wheel and the vertical line passing through the front end of the steering wheel when the parking brake lever is pulled toward the rear of the vehicle, and
  wherein the pin is attached to the bracket, and wherein the parking brake lever is thereby supported by the left upper frame.

5. The vehicle according to claim 4, further comprising a parking brake wire extending from the parking brake lever and routed along the left side sill.

6. The vehicle according to claim 4, further comprising a door attached to the left upper frame via a door hinge, wherein the ingress-egress opening is opened and closed by the door.

7. A vehicle, comprising:
  seating means for accommodating a driver, said seating means being disposed at such a position that a center line thereof is offset by a predetermined distance in a vehicle width direction from a vehicle width center line of the vehicle;
  ingress-egress means for enabling the driver to enter and exit the vehicle, said ingress-egress means being disposed on a lateral side of the seating means;
  steering means for enabling a driver to steer the vehicle, said steering means being disposed on a dashboard on a front side of the seating means;
  lever means for actuating a parking brake, said lever means including a grip portion and being disposed on the dashboard and in front of said seating means,
  wherein, in a side view of the vehicle, the grip portion of the lever means is disposed within a space defined by a horizontal line passing through an upper end of the steering means, a horizontal line passing through a lower end of the steering means and a vertical line passing through a front end of the steering means.

8. The vehicle according to claim 7, wherein the seating means comprises a single front seat of the vehicle.

9. The vehicle according to claim 7,
  wherein the lever means comprises a pin and is swingable toward a front and a rear of the vehicle, and is configured to be set to a parking brake state by a driver pulling an upper portion of the lever means toward a rear of the vehicle, and
  wherein the lever means is disposed within the space defined by the horizontal line passing through an upper end of the steering means, the horizontal line passing through the lower end of the steering means and the vertical line passing through the front end of the steering means when the lever means is pulled toward the rear of the vehicle.

10. A vehicle, comprising:
  seating means for accommodating a driver, said seating means being disposed at such a position that a center line thereof is offset by a predetermined distance in a vehicle width direction from a vehicle width center line of the vehicle;
  ingress-egress means for enabling the driver to enter and exit the vehicle, said ingress-egress means being disposed on a lateral side of the seating means;
  steering means for enabling a driver to steer the vehicle, said steering means being disposed on a dashboard on a front side of the seating means;
  lever means for actuating a parking brake, said lever means including a grip portion and being disposed on the dashboard;
  left upper frame means extending upward from a front portion of a left side sill of a vehicle body frame, said left upper frame means for supporting the lever means; and
  bracket means attached to the left upper frame means,
  wherein, in a side view of the vehicle, the grip portion of the lever means is disposed within a space defined by a horizontal line passing through an upper end of the steering means, a horizontal line passing through a lower end of the steering means and a vertical line passing through a front end of the steering means,
  wherein the lever means comprises a pin and is swingable toward a front and a rear of the vehicle, and is configured to be set to a parking brake state by a driver pulling an upper portion of the lever means toward a rear of the vehicle,
  wherein the lever means is disposed within the space defined by the horizontal line passing through an upper end of the steering means, the horizontal line passing through the lower end of the steering means and the vertical line passing through the front end of the steering means when the lever means is pulled toward the rear of the vehicle, and
  wherein the pin is attached to the bracket means, whereby the lever means is supported by the left upper frame means.

11. The vehicle according to claim 10, further comprising wire means extending from the lever means, said wire means being routed along the left side sill means.

12. The vehicle according to claim 10, further comprising door means for opening and closing the ingress-egress means, said door means being attached to the left upper frame means via a door hinge.

* * * * *